(12) United States Patent
Nii et al.

(10) Patent No.: US 6,243,230 B1
(45) Date of Patent: Jun. 5, 2001

(54) DISK DRIVE UNIT WITH HYDRODYNAMIC FLUID BEARING UNIT AND DISK DEVICE WITH SAID DRIVE UNIT

(75) Inventors: Katsutoshi Nii, Hitachi; Kenji Tomida, Odawara; Hiroshi Nishida, Kanagawa-ken; Kouki Uefune, Odawara; Yuuichi Yanagase, Ibaraki-ken; Masaru Muranishi, Ibaraki-ken; Takashi Kouno, Ibaraki-ken; Kazuhiko Kawakami; Hisanobu Kanamaru, both of Hitachinaka; Noriyuki Kumasaka, Ome, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/277,163

(22) Filed: Mar. 26, 1999

(30) Foreign Application Priority Data

Mar. 31, 1998 (JP) .................................. 10-085497

(51) Int. Cl.$^7$ ...................................... G11B 17/02
(52) U.S. Cl. ........................................ 360/99.08
(58) Field of Search .............................. 360/99.08, 99.04, 360/98.07; 384/114, 118, 121, 123

(56) References Cited

U.S. PATENT DOCUMENTS 5,659,445 * 8/1997 Yoshida et al. ................... 360/98.07
5,715,116 * 2/1998 Moritan et al. .................... 360/99.08

* cited by examiner

Primary Examiner—Robert S. Tupper
(74) Attorney, Agent, or Firm—Antonelli, Terry, Stout & Kraus, LLP

(57) ABSTRACT

A disk drive unit includes a rotary member, which has a spindle, and has an information-recording disk fixedly mounted thereon, and a bearing unit rotatably supporting the spindle. The bearing unit includes a radial bearing device, provided in opposed relation to an outer peripheral surface of the spindle, and a thrust bearing device provided in opposed relation to a distal end surface of the spindle. The radial bearing device has a concentric arc-shaped bearing surface, which is concentric with the circular outer periphery of the spindle, and a non-concentric arc-shaped bearing surface which is non-concentric with the circular outer periphery of the spindle. The disk drive unit further includes a motor for imparting a rotational force to the spindle, and a lubricating fluid filled in the bearing unit.

4 Claims, 9 Drawing Sheets

DISK DRIVE UNIT WITH HYDRODYNAMIC FLUID BEARING UNIT AND DISK DEVICE WITH SAID DRIVE UNIT

BACKGROUND OF THE INVENTION

The present invention relates to a disk drive unit and a disk device having this drive unit, and more particularly to a hydrodynamic fluid bearing unit for the disk drive unit.

Recently, in order to achieve the high-speed transfer of data and high-density recording, a motor in a magnetic disk drive unit has been more and more required to achieve a high-speed, high-precision rotation. In order to meet this requirement, a motor (as disclosed in JP-A-5-336696, JP-A-8-189525 and JP-A-9-200998), having a hydrodynamic bearing, has been proposed.

A motor in a magnetic disk drive unit is intensely required to have an improved shock resistance so that the function of the disk drive unit will not be deteriorated when a personal computer, incorporating the disk drive unit, is dropped from a desk or is fallen while it is carried.

Particularly, a notebook-type personal computer can undergo an impact force of about 1,000 G while it is used or carried, depending on the manner of handling it. And besides, since the notebook-type personal computer is driven by a battery, it requires a disk drive unit of the low power consumption-type.

A groove bearing, wherein shallow grooves for producing a dynamic pressure are formed in a spindle, is proposed in JP-A-5-336696. Although this groove bearing is excellent in high-speed operation and in accuracy of the spindle rotation, it has problems that the production cost is high and that the mass production can not be easily carried out. The depth of the dynamic pressure-producing grooves in the groove bearing are several microns, and when the grooves are deformed by an impact load, the adequate dynamic pressure cannot be produced, which results in a possibility that the unstable vibration occurs. A hydrodynamic three-lobe bearing, disclosed in JP-A-8-189525 and JP-A-9-200998, can achieve high-speed, high precision rotation equivalent to that obtained with the above groove bearing. However, when an impact force of about 1,000 G acts on this bearing, edge portions of the grooves can be deformed, so that its bearing characteristics are deteriorated.

JP-A-8-189525 discloses a groove-type thrust bearing. When a bearing surface of the groove-type thrust bearing is deformed by an impact force, it is liable that a lubricating fluid is not properly supplied to the bearing surface.

The groove-type bearing supports or bears a thrust load at an end surface of a spindle or bearing, and therefore is subjected to a larger friction loss as compared with a ball bearing-type, and it is difficult to achieve a low power consumption design.

SUMMARY OF THE INVENTION

With the above problems of the prior art in view, it is an object of this invention to provide a disk drive unit provided with a bearing unit which has a small friction loss, and is excellent in shock resistance and mass production efficiency.

Another object of the invention is to provide a magnetic disk device provided with the above disk drive unit.

According to one aspect of the present invention, there is provided a disk drive unit comprising:

a rotary member having a spindle;

an information-recording disk being fixedly mounted on said rotary member;

a bearing unit rotatably supporting the spindle, the bearing unit including a radial bearing device provided in opposed relation to an outer peripheral surface of the spindle, the radial bearing device having a concentric arc-shaped bearing surface that is concentric with the circular outer periphery of the spindle, and a non-concentric arc-shaped bearing surface that is non-concentric with the circular outer periphery of the spindle, and a thrust bearing device provided in opposed relation to a distal end surface of the spindle;

a motor for imparting a rotational force to the spindle; and a lubricating fluid filled in the bearing unit.

The maximum distance between the spindle and each of the non-concentric arc-shaped bearing surfaces is 1.5 to 3 times larger than the distance between the spindle and each of the concentric arc-shaped bearing surfaces.

The distal end surface of the spindle is formed into a flat surface, and the thrust bearing device has a flat surface which is smaller in diameter than the spindle, and is held in opposed relationship with the flat distal end surface of the spindle.

In one form of the invention, the distal end surface of the spindle is rounded, and the thrust bearing device has a flat surface held in opposed relationship with the rounded distal end surface of the spindle.

In another form of the invention, the distal end surface of the spindle is rounded, and the thrust bearing device has a concave surface which is substantially complementary to the rounded distal end surface of the spindle, and is held in opposed relationship with the rounded distal end surface.

In one form of the disk drive unit of the invention, the radial bearing device comprises a plurality of radial bearings arranged in a direction of an axis of the spindle, and at least one of the plurality of radial bearings has only the concentric arc-shaped bearing surface, and each of the other radial bearings has a plurality of the non-concentric arc-shaped bearing surfaces and axial grooves each formed between the associated adjacent non-concentric arc-shaped bearing surfaces.

In another form of the disk drive unit of the invention, the radial bearing device comprises a plurality of radial bearings arranged in a direction of an axis of the spindle, and each of the plurality of radial bearings has a plurality of the concentric arc-shaped bearing surfaces, a plurality of the non-concentric arc-shaped bearing surfaces and axial grooves each formed between the associated adjacent non-concentric arc-shaped bearing surfaces, and the plurality of concentric arc-shaped bearing surfaces of the radial bearing extend ⅙ to ¾ of an inner peripheral surface of the radial bearing in a circumferential direction.

Preferably, the plurality of concentric arc-shaped bearing surfaces of the radial bearing extend about ⅓ of the inner peripheral surface of the radial bearing in the circumferential direction.

When viewed in a direction of an axis of the spindle, each of the plurality of concentric arc-shaped bearing surfaces is disposed substantially centrally between the associated adjacent axial grooves. Alternatively, each of the plurality of concentric arc-shaped bearing surfaces is disposed adjacent to the associated axial groove.

According to another aspect of the invention, there is provided a disk device comprising:

a rotary member having a spindle;

an information-recording disk being fixedly mounted on the rotary member;

a bearing unit rotatably supporting the spindle, the bearing unit including a radial bearing device provided in opposed relation to an outer peripheral surface of the spindle, the radial bearing device having a concentric arc-shaped bearing surface that is concentric with the circular outer periphery of the spindle, and a non-concentric arc-shaped bearing surface that is non-concentric with the circular outer periphery of the spindle, and a thrust bearing device provided in opposed relation to a distal end surface of the spindle, a motor for imparting a rotational force to the spindle;

a lubricating fluid filled in the bearing unit;

a read/write head disposed in opposed relation to the information-recording disk; and an actuator for positioning the head on said information-recording disk.

DESCRIPTION OF THE PREFERRED EMBODIMENTS

Figure 1:
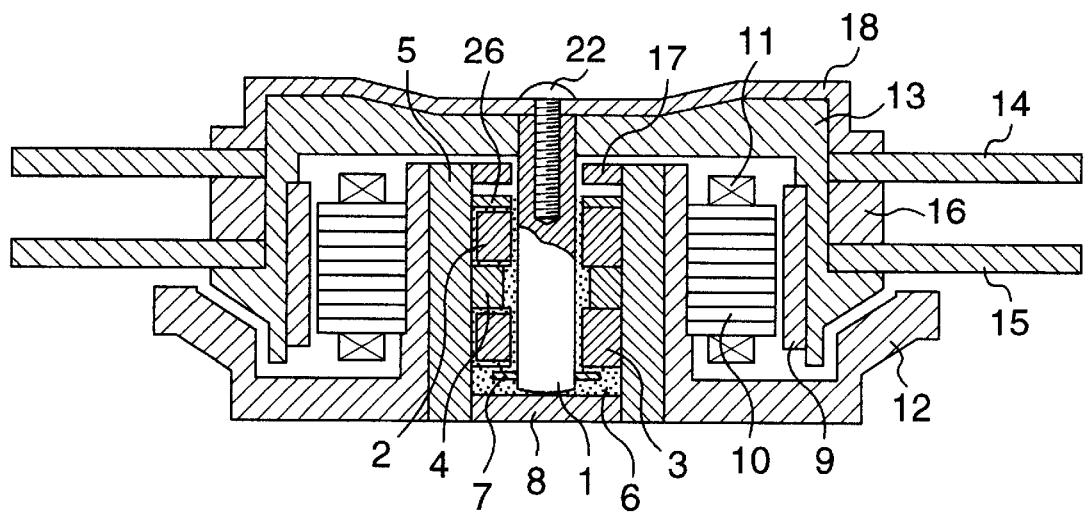
FIG. 1 is a vertical cross-sectional view of a first embodiment of a magnetic disk drive unit of the invention.

The present invention will now be described with reference to the drawings.

FIGS. 1 to 4 show a first embodiment of a magnetic disk drive unit of the present invention. Although this embodiment is directed to the magnetic disk drive unit, the present invention can be applied to any other suitable device for driving or rotating an information-recording medium.

A spindle 1 is fixedly secured to a hub 13 having a cylindrical surface for mounting disks thereon. Magnetic disks 14 and 15 are fixedly secured to the hub 3 by a screw 22 through a disk clamp 18 and a spacer ring 16. A motor rotor (rotor magnet) 9, magnetized in a multi-pole pattern, is fixedly secured to an inner peripheral surface of the hub 13. The spindle 1 is rotatably supported by radial bearings 2, 3 and 26 and a thrust bearing 8. A retainer ring 7 is fixedly mounted on an end portion of the spindle 1.

A cover 17, the radial bearings 2, 3 and 26, the thrust bearing 8 and the retainer ring 7 are provided in a bearing housing 5 made of a non-magnetic material, and a lubricating fluid 6 is sealed in the bearing housing 5. The bearing housing 5 and a motor stator 10, having a motor coil 11, are fixedly mounted on a motor casing 12.

The motor of this construction is a DC brushless motor, and the hub 13 is driven by a rotating magnetic field, produced when the coil 11 is energized, and a magnetic field possessed by the motor rotor 9 magnetized in a multi-polar manner.

Figure 2:
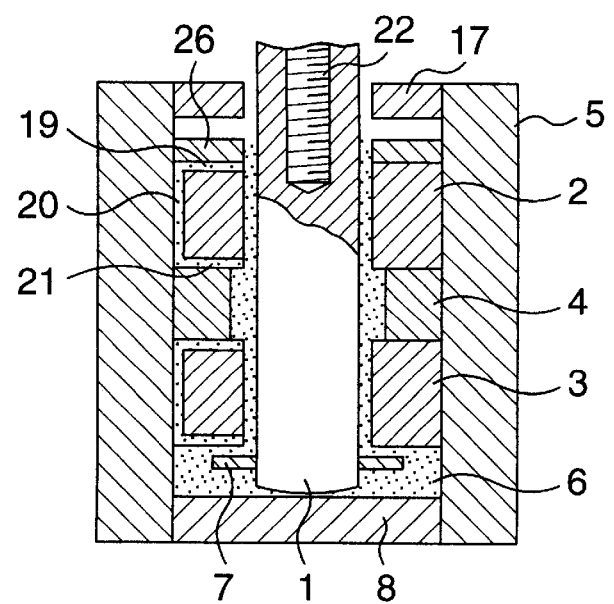
FIG. 2 is an enlarged, vertical cros-sectional view of a bearing unit of the first embodiment.

The bearing 26, having only a circular (arc-shaped) surface concentric with the spindle 1, and the bearings 2 and 3, each having non-concentric, arc-shaped surfaces (see FIG. 4), are provided in the bearing unit of FIG. 2. A spacer 4 is provided between the bearings 2 and 3. The distal end of the spindle 1 is formed into a generally semi-spherical shape, and the flat thrust bearing 8 is disposed in opposed relation to this distal end.

The lubricating fluid 6 is sealed in the bearing housing 5, and the spindle 1 is supported in a non-contact manner by the radial bearings 26, 2 and 3 through the lubricating fluid 6.

Ordinary lubricating oil may be used as the lubricating fluid 6. However, preferably, in order to achieve a sealing effect, a ring-shaped permanent magnet, made of a rare earth element, is used as the spacer 4, and a magnetic fluid, having superfine magnetic powder (having a particle size of about 0.01 μm) dispersed in lubricating oil, is used as the lubricating fluid 6. With this construction, the magnetic fluid is attracted by the spacer 4 comprising the permanent magnet, and will not leak to the exterior of the bearing unit. The gap between the spindle 1 and the radial bearings 2, 3 and 26, is very small on the order of several micron meters, and therefore in a stationary condition, the sliding surfaces of the spindle and the radial bearings are wetted with the magnetic fluid 6 because of a capillary phenomenon. Therefore, when the spindle 1 is driven, the sliding surfaces between the bearing and the spindle are lubricated from the beginning of the rotation. And besides, the magnetic fluid 6, overflowing the radial bearing 2 because of the expansion of the volume of the magnetic fluid 6 by a temperature rise and a hydrodynamic effect of the bearing, is attracted by the spacer 4 of a permanent magnet via grooves 19, 20 and 21 (FIG. 2) formed in bearing end surfaces and bearing outer peripheral surfaces of the radial bearings 2 and 3. Therefore, there is no fear that the magnetic fluid 6 leaks to the exterior of the bearing unit.

Figure 3:
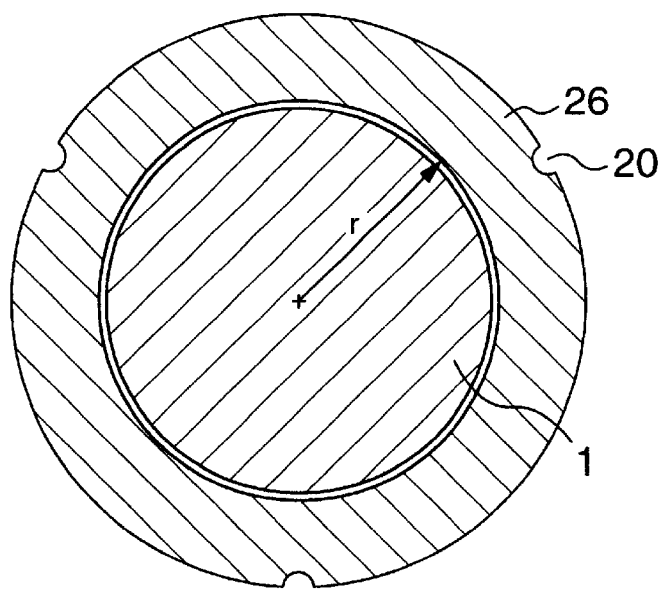
FIGS. 3 and 4 are transverse cross-sectional views of radial bearings of the first embodiment, respectively.
Figure 4:
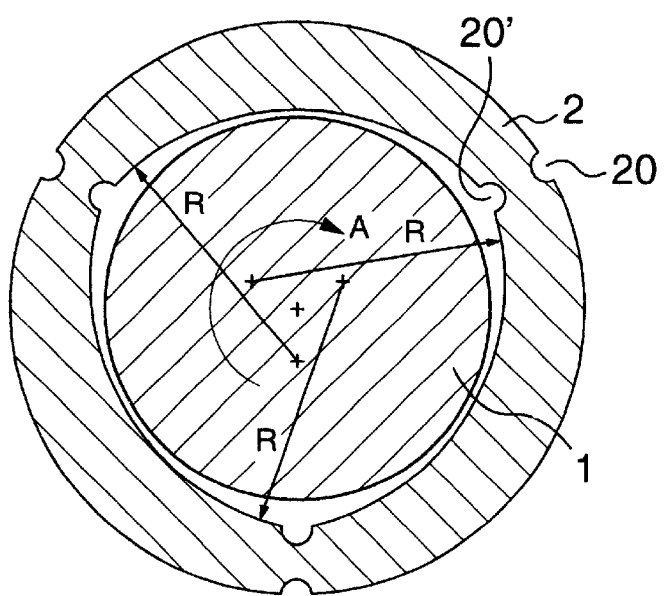
Figure 5:
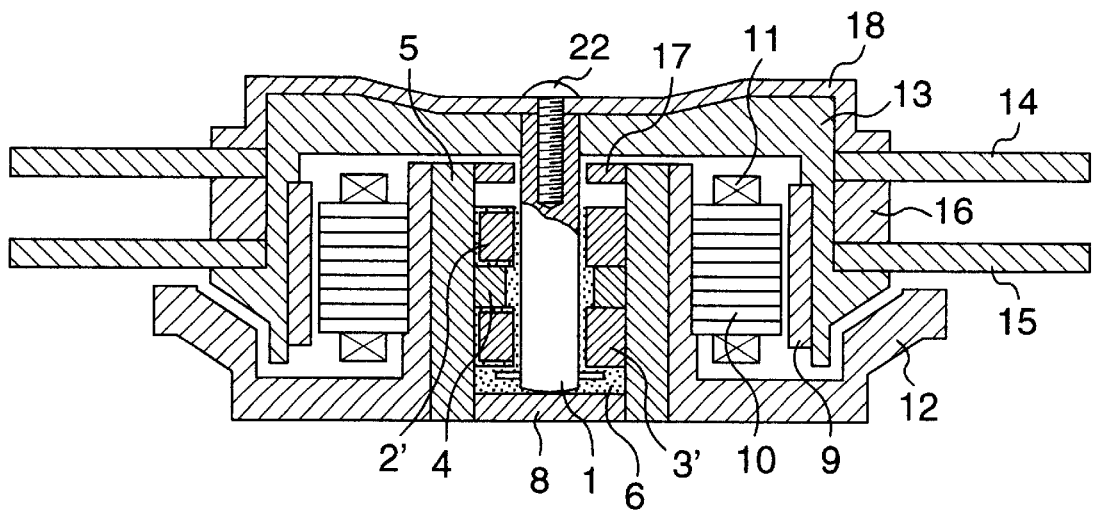
FIG. 5 is a vertical cross-sectional view of a second embodiment of a magnetic disk drive unit of the invention.

FIG. 3 shows the configuration of the radial bearing 26 having only the concentric circular (arc-shaped) bearing surface, and this radial bearing is a cylindrical bearing having a radius r. FIG. 4 shows the configuration of the radial bearing 2, 3 including the non-concentric arc-shaped bearing surfaces. More specifically, the radial bearing 2, 3 has the three arc-shaped bearing surfaces, which are not concentric or coaxial with the axis of the bearing, and have a radius (arc radius) R, and axial grooves 20' each formed between the adjacent bearing surfaces. When an impact force is applied, the radial bearing 26 and the spindle 1 come substantially into surface contact with each other since they have substantially the same curvature. In this case, if the lubricating fluid is provided on the bearing surface, a damping effect due to a squeeze action effect is large, and therefore the spindle 1 and the radial bearing hardly come into direct contact with each other. During the rotation, in addition to the effect of the radial bearing 26, the spindle 1 is supported in a non-contact manner by an oil film because of the hydrodynamic effect of the radial bearings 2 and 3, and therefore the shock resistance is enhanced. And besides, since the spindle 1 is supported highly stiff by the oil film, the precise rotation can always be maintained.

Next, a second embodiment of a magnetic disk drive unit of the present invention will be described with reference to FIGS. 5 to 8.

Figure 6:
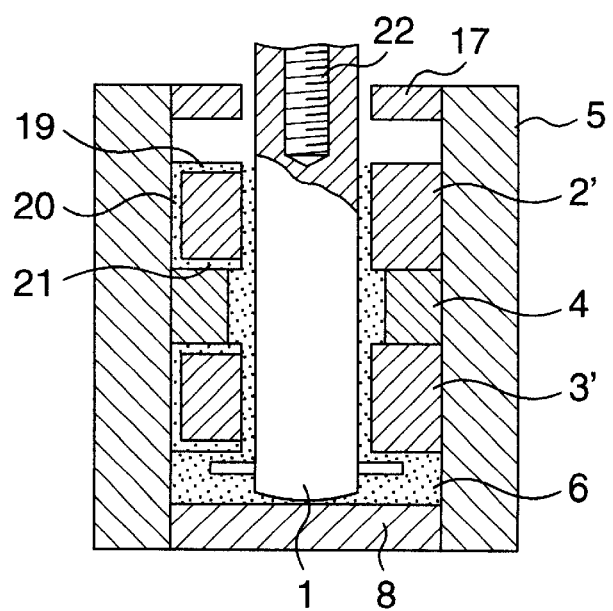
FIG. 6 is an enlarged, vertical cross-sectional view of a bearing unit of the second embodiment.
Figure 7:
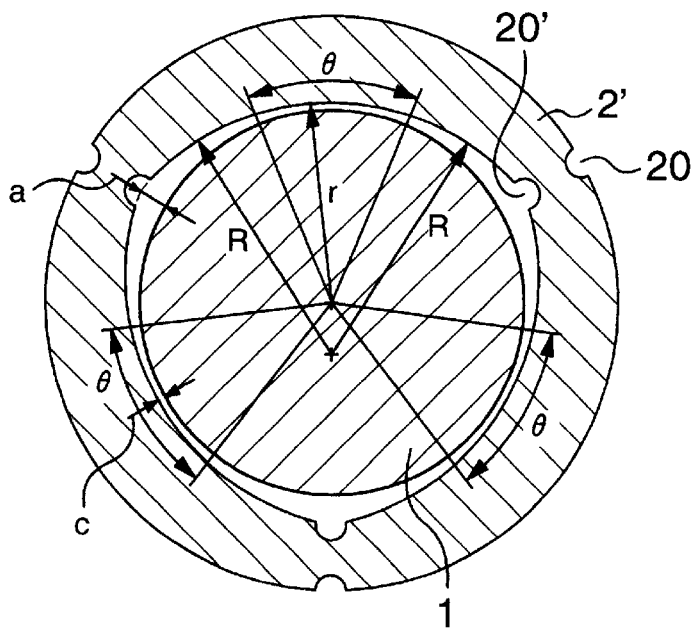
FIG. 7 is a transverse cross-sectional view of a radial bearing of the second embodiment.

FIG. 6 shows a bearing unit of this disk drive unit which differs from the bearing unit of FIG. 2 in that the radial bearing 26 is not provided. The radial bearings 2' and 3' are different in configuration from the radial bearings 2 and 3 of the first embodiment in that a bearing surface of the radial bearings 2' and 3' has portions for surface contact with a spindle 1 upon being subjected to an impact load, as shown in FIG. 7.

More specifically, each of the radial bearings 2' and 3' has bearing surfaces, which are concentric or coaxial with the axis of the spindle 1, and have an arc radius r, and bearing surfaces which are not concentric or coaxial with the axis of the spindle 1, and have an arc radius R. In the radial bearing 2', 3' shown in FIG. 7, the concentric arc-shaped bearing surfaces are represented by θ, and each of these concentric arc-shaped bearing surfaces is provided centrally between adjacent axial grooves 20'. When an external impact force is applied, these concentric arc-shaped bearing surfaces perform a damping effect.

Figure 8:
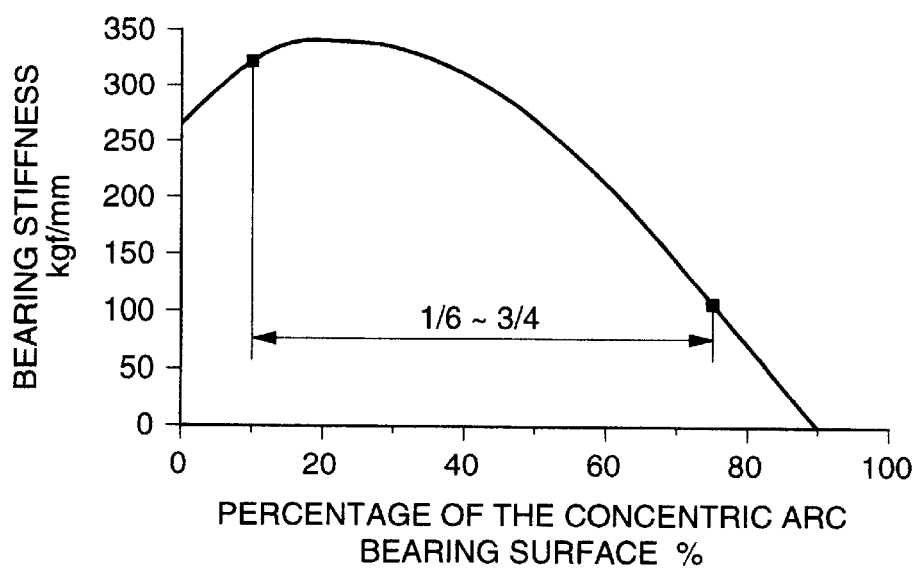
FIG. 8 is a graph showing the relation between a bearing stiffness of the radial bearing and concentric arc-shaped bearing surfaces in the second embodiment.

Particularly when the concentric bearing surfaces θ, having the arc radius r, are suitably designed, the rigidity of the oil film for the bearing is about 1.5 times larger as compared with the conventional hydrodynamic bearing, and therefore the more enhanced rotation precision can be obtained. With respect to the optimum dimension of the bearing surfaces θ determined by the bearing stiffness, the sum of the dimensions of the bearing surfaces θ is in the range of about ⅓ of the entire bearing surface, as shown in FIG. 8. In order to enhance the shock resistance, the sum of the dimensions of the bearing surfaces θ should be about ¾ of the entire bearing surface though this slightly lowers the oil film stiffness of the bearing.

Even if the sum of the dimensions of the bearing surfaces θ is not more than ⅙ of the entire bearing surface, similar results can be obtained, and preferably the sum of the dimensions of the bearing surfaces θ is ⅙ to ¾. If the maximum gap a between the non-concentric arc-shaped bearing surface and the spindle is 1.5 to 3 times larger than the gap c between the concentric arc-shaped bearing surface and the spindle, the stiffness of the oil film due to the hydrodynamic effect is increased.

Figure 9:
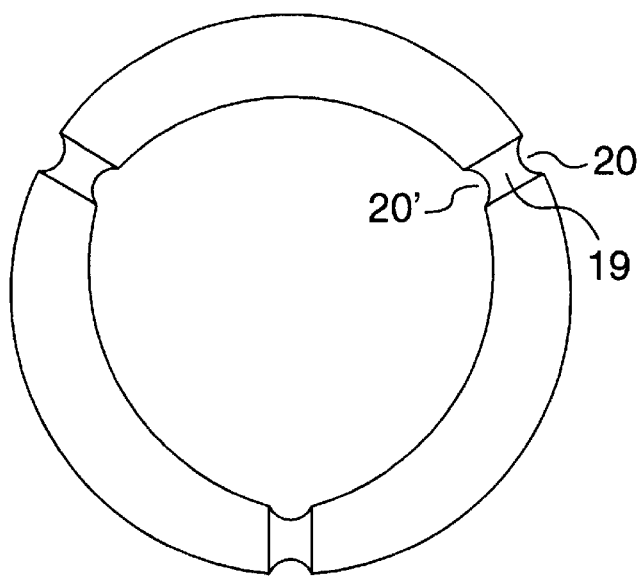
FIG. 9 is a plan view of the radial bearing of the second embodiment.

As shown in FIG. 9, grooves 19 are formed in a bearing end surface of the radial bearing 2', 3', and grooves 20 are formed in the outer peripheral surface thereof. With this construction, a magnetic fluid 6 is drawn by a magnetic attraction force of a spacer 4, comprising a permanent magnet, as described above.

The hydrodynamic radial bearing of the present invention can be formed or shaped using a sintered lubricant-containing bearing material, and by doing so, the bearing unit, having good dimensional accuracy and excellent mass production efficiency, can be provided.

Figure 10:
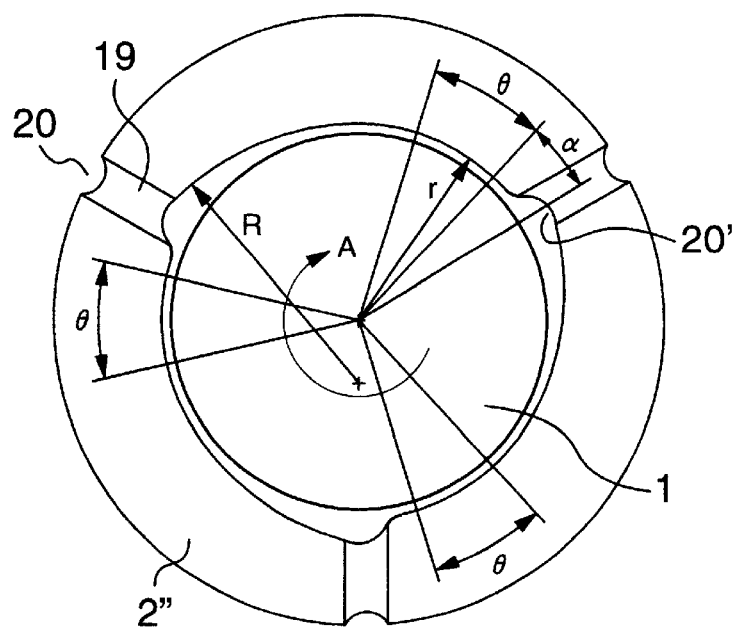
FIG. 10 is a plan view of a modified radial bearing of the second embodiment.

As shown in FIG. 10, the concentric arc-shaped bearing surfaces can be provided near to the grooves 20', respectively.

Figure 11:
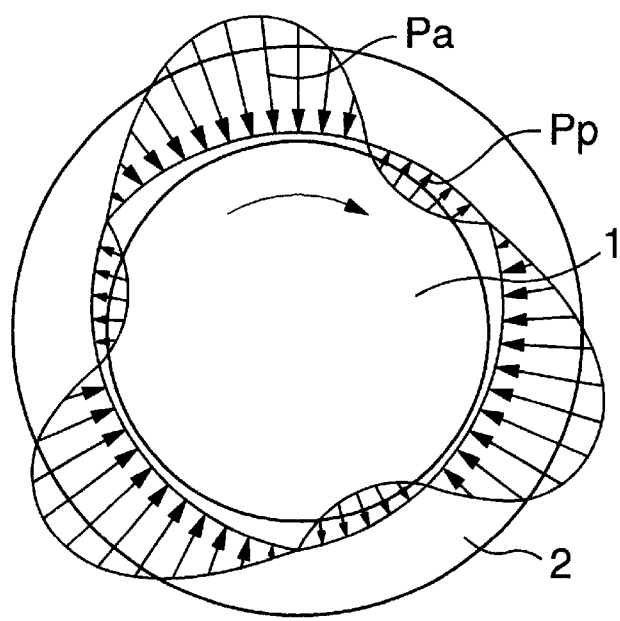
FIG. 11 is a view explanatory of a hydrodynamic effect of the modified radial bearing.

The hydrodynamic effect of the hydrodynamic bearings, shown respectively in FIGS. 7 and 10, will be described. The bearing gap between the spindle 1 and the bearing surface is gently decreasing or narrowing as shown in the drawings. Therefore, when the spindle 1 rotates in a direction of arrow A, oil film pressures Pa, having a profile shown in FIG. 11, develop, and serve to hold the spindle 1 at the axis (centerline) of the bearing. In contrast, the gap between the spindle 1 and the bearing surface at those portions designated by α is increasing in the direction of rotation, and therefore negative oil pressures Pb develop, and serve to lower the bearing stifness.

It is desirable for the bearing that the negative oil pressures Pb are small. However, the negative pressures serve to return the magnetic fluid from the bearing end surface to the bearing surface. Thus, the negative pressures serve to draw the magnetic fluid to the bearing surface, and therefore if the dimension of α is set to about ¹⁄₁₀ of the bearing surface, the magnetic fluid on the bearing end surface can be returned to the bearing surface without hardly lowering the performance of the bearing. In the bearing shown in FIG. 7, each concentric arc-shaped bearing surface is disposed centrally between the adjacent axial grooves 20', and therefore this bearing is designed for supporting the spindle rotating in opposite directions. On the other hand, the bearing, shown in FIG. 10, is designed for supporting the spindle rotating in one direction.

Figure 12:
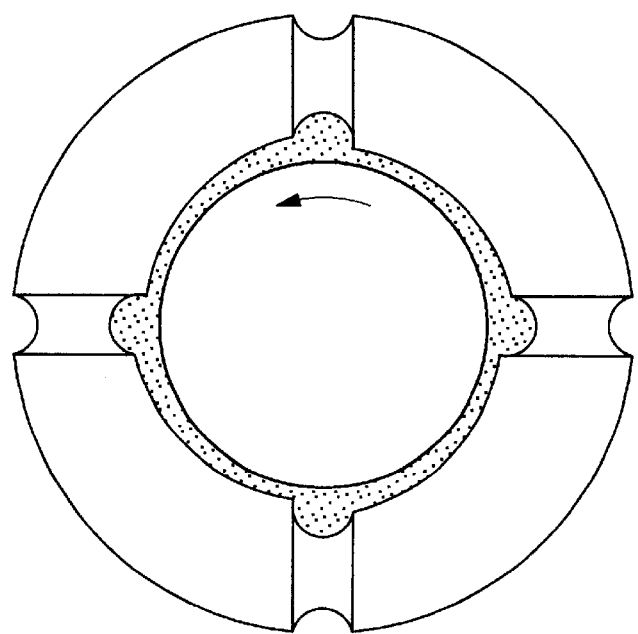
FIG. 12 is a plan view of a modified form of the radial bearing shown in FIG. 10.

In the above embodiment, although each of the radial bearings has the three concentric arc-shaped bearing surfaces and the three non-concentric arc-shaped bearing surfaces, each radial bearing may have three or more arc-shaped bearing surfaces (for example, 4 to 5 arc-shaped bearing surfaces as shown in FIG. 12). In this case, similar effects as described above can be achieved, and besides the higher-precision rotation can be obtained, and this construction is suited for the type of magnetic disk drive unit required to have a particularly-high rotation precision.

Figure 13:
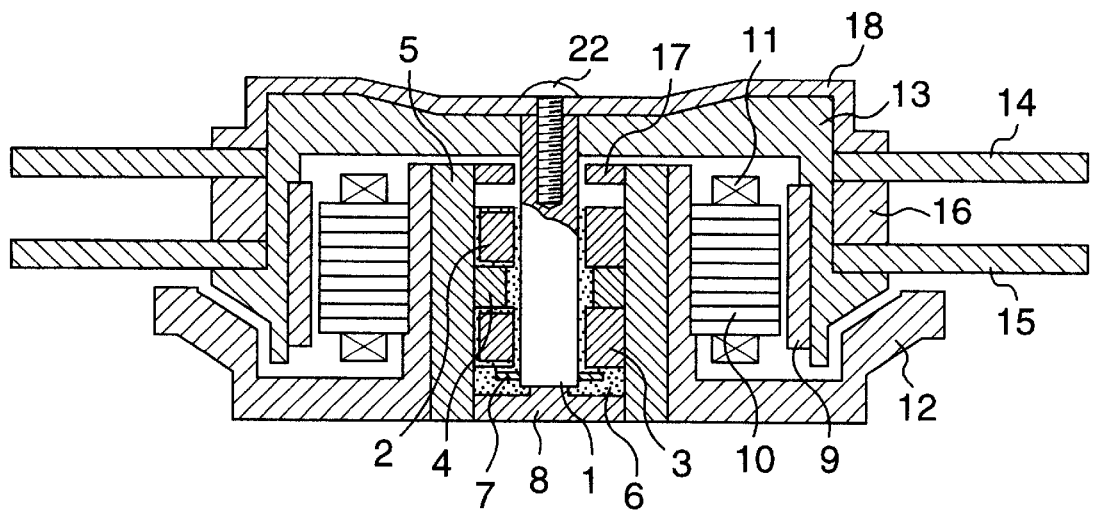
FIG. 13 is a vertical cross-sectional view of a third embodiment of a magnetic disk drive unit of the invention.
Figure 14:
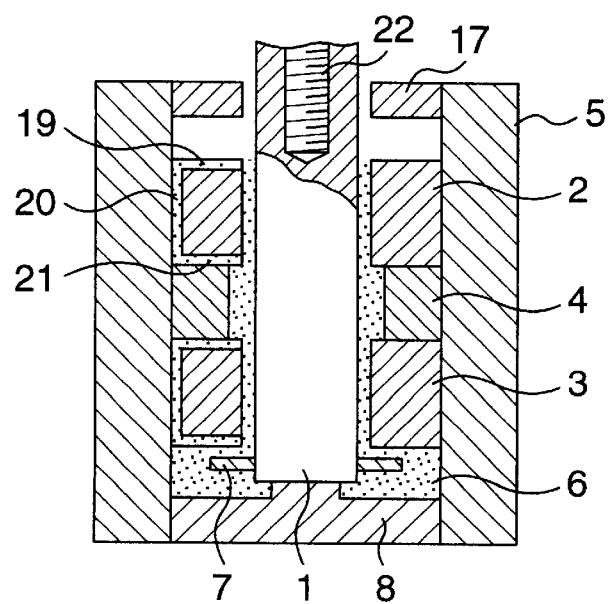
FIG. 14 is an enlarged, vertical cross-sectional view of a bearing unit of the third embodiment.

FIGS. 13 and 14 show a third embodiment of a disk drive unit of the present invention. In this embodiment, a distal end of a spindle 1 is flat, and a bearing surface of a thrust bearing 8 is flat, and is smaller in diameter than the spindle 1. A bearing unit of this embodiment differs from the bearing unit of FIG. 6 in that an impact force, applied in a thrust direction, is supported or borne by the flat surface of the thrust bearing 8 and the distal end surface of the spindle 1. This construction has a higher shock resistance as compared with the thrust bearing of FIG. 6.

If the diameter of the contact surface of the thrust bearing 8 is ½ to ⅔ of the diameter of the spindle 1, the deformation of the bearing surface, developing upon application of an impact force of 1,000 G, is on the order of sub-micron meters, and therefore the precision of the magnetic disk device will not be deteriorated. Although a friction loss is slightly larger as compared with the bearing of the first embodiment, the smooth rotation can be achieved since an oil film is provided on the sliding surface.

Figure 15:
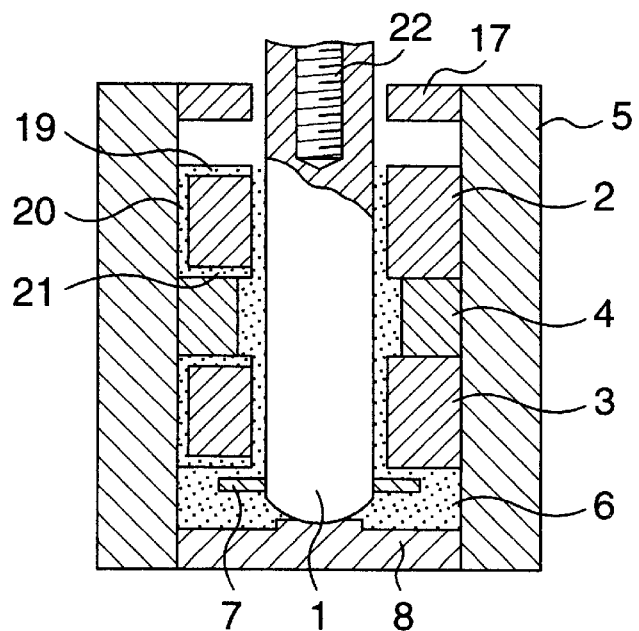
FIG. 15 is an enlarged, vertical cross-sectional view of a bearing unit used in a fourth embodiment of a magnetic disk drive unit of the invention.

FIG. 15 shows a fifth embodiment of a magnetic disk drive unit of the present invention. In this embodiment, a thrust bearing, having a flat surface, is used in combination of a spindle 1, having a distal end of a generally semi-spherical shape, as shown in FIG. 2, and a load, corresponding to an impact force of 1,000 G, is beforehand applied to form the bearing surface of the thrust bearing into a concave surface having substantially the same semi-spherical shape as that of the distal end of the spindle 1.

When a load of several tens of kilograms is applied to a motor, having a conventional ball bearing, in an axial direction, a dent is formed on a rolling surface of the bearing or balls. As a result, a rotating sound is increased, and also the rotation precision is much deteriorated. On the other hand, in the bearing unit of the present invention, a thrust load is supported or borne by the surface, that is, by the surface contact. Therefore, even if the bearing unit is press-fitted into the motor casing 12 while applying a load of several tens of kilograms to the spindle 1, the bearing surface of the thrust bearing is hardly deformed, and therefore the assembling efficiency of the magnetic disk device is greatly enhanced.

Figure 16:
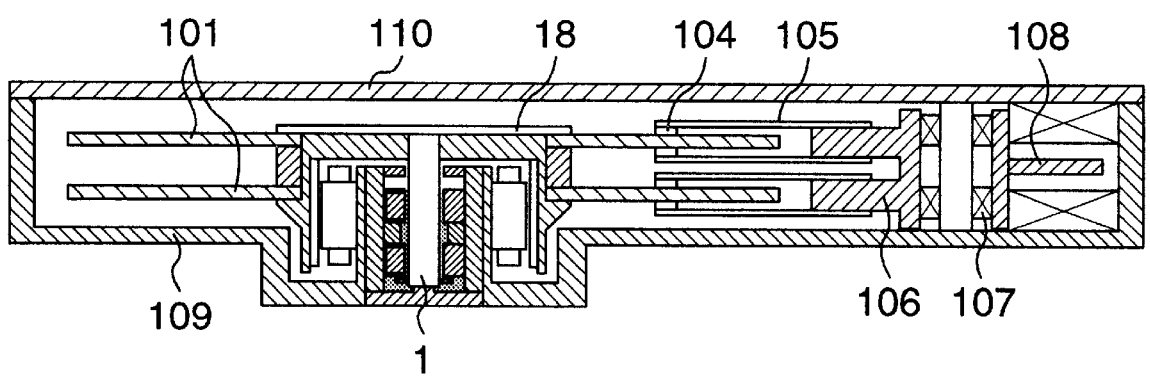
FIG. 16 is a vertical cross-sectional view of a magnetic disk device of the invention, taken along line XVI—XVI in FIG. 17.

FIG. 16 shows a magnetic disk device of the present invention. Although this embodiment is directed to the magnetic disk device, the present invention can be applied to any other suitable device or unit designed to store information in a rotating information-recording medium.

A magnetic head 104 is provided on one or each side of each magnetic disk (information-recording medium) 101 in opposed relation thereto. When the magnetic disk 101 is rotated, the magnetic head 104 flies a microscopic distance off the magnetic disk 101, and in this condition the magnetic head 104 reads and writes magnetic information relative to the magnetic disk 101. The magnetic head 104 is connected to a carriage 106 through a load arm 105.

The carriage 106 is pivotally supported by a pivot bearing 107 so as to be pivotally moved about an axis of this pivot bearing 107. With this construction, desired track on the magnetic disk 101 can be accessed. A voice-coil motor 108 is provided at that side of the carriage 106 facing away from the magnetic heads 104, and moves the magnetic head 104 at high speed to a desired track, and locates it at this track on the magnetic disk 101.

The load arms 105, the carriage 106, the pivot bearing 107 and the voice-coil motor 108 jointly constitute an actuator. Generally, the pivot bearing 107 and the voice-coil motor 108 are pivotally mounted on a base 109 through pivot shafts. The provision of the load arms 105 may be omitted. In order to protect these constituent parts from external dirt and dust, a cover 110 is attached to the base 109, so that the constituent parts are isolated from the exterior.

Figure 17:
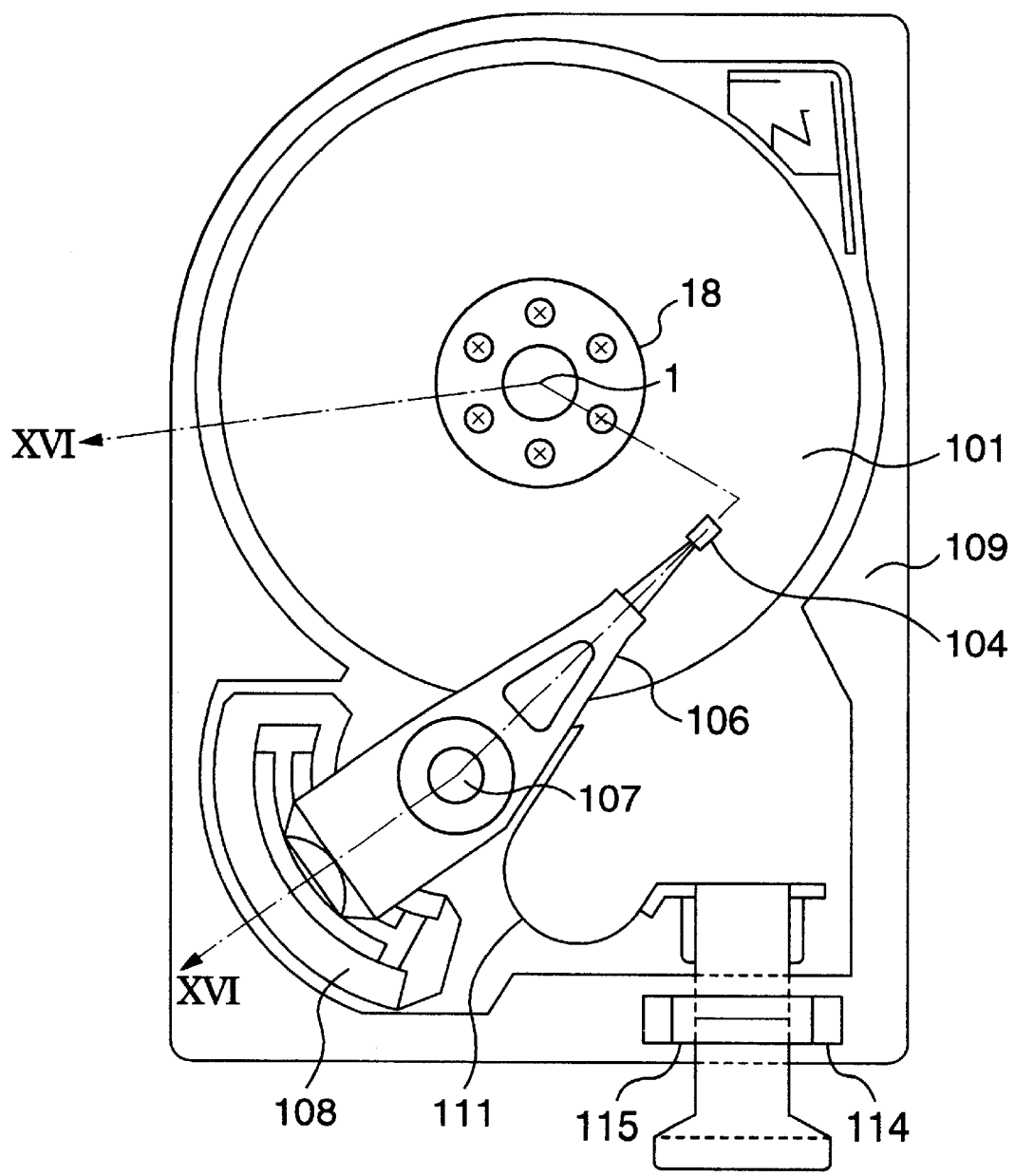
FIG. 17 is a plan view of the magnetic disk device of the invention.

FIG. 17 is a plan view of the magnetic disk device of FIG. 16, with the cover removed.

A spindle 1 is rotatably mounted on the base 109, and the magnetic disks 101 are fixedly mounted on the spindle 1 through a fixing member 18. Each magnetic head 104 is fixedly secured to the carriage 106, and is disposed in proximity to the associated magnetic disk 101. The carriage 106 is pivotally supported by the rotation shaft 107, and is driven by the voice-coil motor 108. A signal, read by the magnetic head 104, is transmitted to the exterior of the sealed structure via a flexible connecting conductor 111. Adhesive members 14 and 115 are provided at an outlet port (through which the flexible connecting conductor 111 passes) in the sealed structure, and hold the flexible connecting conductor 111 therebetween. Longer sides of the adhesive member 114 are different in length from the longer sides of the adhesive member 115. The cover 110 (FIG. 16) is attached to the base 109, and with this construction the sealed structure is provided.

Here, description will be made of effects achieved when using the bearing unit of the present invention (for example, the bearing unit of FIG. 14) as the motor bearing unit in the magnetic disk device, will be described.

In the magnetic disk device, as many magnetic disks 101 as possible are packaged or received in the magnetic disk device having a limited height (vertical dimension) so as to obtain an increased memory capacity. Therefore, generally, a gap between the magnetic disk 101 and the load arm 105, or a gap between the magnetic disk 101 and the carriage 106, is microscopic on the order of not more than 0.5 mm. When a hydrodynamic bearing is used as a motor bearing, gaps of radial bearings exist, and if these gaps are large, the magnetic disk 101 is much tilted upon application of an impact or the like, so that the magnetic disk 101 is brought into contact with the load arm 105 or the carriage 106. As a result, the magnetic disk 101 is damaged, and the magnetic head 104 is damaged by powder dust produced by such contact. Therefore, in the magnetic disk device, it is necessary to reduce the gaps of the radial bearings as much as possible.

In the case of a groove bearing, an inner peripheral surface of the bearing is concentric (coaxial) and circular with respect to the axis of the bearing over an entire circumference thereof. Therefore, if a bearing gap is reduced, a friction loss increases. On the other hand, in the bearing unit of the present invention, the gap between each concentric arc-shaped bearing surface (which is concentric with respect to the axis of the bearing) and the outer peripheral surface of the spindle is reduced, and by doing so, the tilting of the disk due to a gap (play) in the bearing portion can be suppressed. And besides, the gap between each non-concentric arc-shaped bearing surface (which is non-concentric with respect to the axis of the bearing) is increased, and by doing so, the increase of the friction loss can be suppressed. Therefore, in the magnetic disk device of this embodiment, not only the bearing unit but also the magnetic disk device can be enhanced in shock resistance without increasing the power consumption.

In the hydrodynamic bearings of the present invention, the stiffness of the oil film for the bearing is high because of the above-mentioned effects, and therefore the high-precision rotation can be maintained, and the excellent shock resistance is achieved. And besides, the bearing gap can be made larger as compared with a cylindrical bearing and the above-mentioned conventional groove bearing, and therefore the viscous friction loss is small, so that the low-loss design of the motor can be achieved.

Furthermore, since the thrust bearing has the flat surface, the shock resistance in the axial direction is excellent. The surface, bearing the thrust load, is smaller in diameter than the spindle, and therefore the friction loss is smaller as compared with a thrust bearing of the hydrodynamic groove type, and there can be provided the magnetic disk drive motor of a low power consumption-type suited for the magnetic disk device. And besides, the hydrodynamic bearings of the present invention can be produced using a sintered lubricant-containing bearing material excellent in mass production efficiency, and therefore there can be provided the bearing unit wherein the dimensional accuracy of the bearing is high, and is suited for the magnetic disk device even from the viewpoint of the cost. And, the assembling precision and the rotation precision are high, and the requirements of the high-density and high-speed design of the magnetic disk device can be met.

By using the radial bearing and the thrust bearing of the present invention, there can be provided the magnetic disk device wherein the bearing is hardly deformed even if a large impact force is applied, and the dimensional precision of the magnetic disk can be maintained, and the excellent shock resistance is achieved. The bearing unit of the present invention is designed to bear a thrust load by the surface, and therefore even if this bearing unit is press-fitted into the motor casing 12 while applying a load of several tens of kilograms to the spindle 1, the thrust bearing surface is hardly deformed, and therefore the assembling efficiency of the magnetic disk device is greatly enhanced.

As described above, the bearing unit, the disk drive unit having this bearing unit, and the magnetic disk device having this bearing unit, can meet the requirements of the high-density recording of the magnetic disk medium, the mass production and low-cost production of the magnetic disk device, and the long-lifetime and high-reliability design of the disk drive unit. The bearing units, described and shown in the present specification and drawings, can be applied to a disk rotating (driving) mechanism used in a MD device, a CD-ROM device, a DVD-RAM device and the like.

What is claimed is:

1. A disk drive unit comprising:

a rotary member having a spindle;

an information-recording disk being fixedly mounted on said rotary member;

a bearing unit rotatable supporting said spindle, the bearing unit including:

a radial bearing device provided in opposed relation to an outer peripheral surface of said spindle, the radial bearing device having a concentric arc-shaped bearing surface that is concentric with said circular outer periphery of said spindle, and a non-concentric arc-shaped bearing surface that is non-concentric with said circular outer periphery of said spindle; and a thrust bearing device provided in opposed relation to a distal end surface of said spindle;

a motor for imparting a rotational force to said spindle; and a lubricating fluid filled in said bearing unit;

wherein said distal end surface of said spindle is formed into a flat surface, and said thrust bearing device has a flat surface which is smaller in diameter than said spindle, and is held in opposed relationship with said flat distal end surface of said spindle.

2. A disk drive unit comprising:

a rotary member having a spindle;

an information-recording disk being fixedly mounted on said rotary member;

a bearing unit rotatable supporting said spindle, the bearing unit including:

a radial bearing device provided in opposed relation to an outer peripheral surface of said spindle, the radial bearing device having a concentric arc-shaped bearing surface that is concentric with said circular outer periphery of said spindle, and a non-concentric arc-shaped bearing surface that is non-concentric with said circular outer periphery of said spindle; and a thrust bearing device provided in opposed relation to a distal end surface of said spindle;

a motor for imparting a rotational force to said spindle; and a lubricating fluid filled in said bearing unit;

wherein said distal end surface of said spindle is rounded, and said thrust bearing device has a concave surface which is substantially complementary to said rounded distal end surface of said spindle, and is held in opposed relationship with said rounded distal end surface.

3. A disk device comprising:

a rotary member having a spindle;

an information-recording disk being fixedly mounted on said rotary member;

a bearing unit rotatable supporting said spindle, the bearing unit including:

a radial bearing device provided in opposed relation to an outer peripheral surface of said spindle, the radial bearing device having a concentric arc-shared bearing surface that is concentric with said circular outer periphery of said spindle, and a non-concentric arc-shaped bearing surface that is non-concentric with said circular outer periphery of said spindle; and a thrust bearing device provided in opposed relation to a distal end surface of said spindle;

a motor for imparting a rotational force to said spindle;

a lubricating fluid filled in said bearing unit;

a read/write head disposed in opposed relation to said information-recording disk; and an actuator for positioning said head on said information-recording disk;

wherein said distal end surface of said spindle is formed into a flat surface, and said thrust bearing device has a flat surface which is smaller in diameter than said spindle, and is held in opposed relationship with said flat distal end surface of said spindle.

4. A disk device comprising:

a rotary member having a spindle;

an information-recording disk being fixedly mounted on said rotary member;

a bearing unit rotatable supporting said spindle, the bearing unit including:

a radial bearing device provided in opposed relation to an outer peripheral surface of said spindle, the radial bearing device having a concentric arc-shaped bearing surface that is concentric with said circular outer periphery of said spindle, and a non-concentric arc-shaped bearing surface that is non-concentric with said circular outer periphery of said spindle; and a thrust bearing device provided in opposed relation to a distal end surface of said spindle;

a motor for imparting a rotational force to said spindle;

a lubricating fluid filled in said bearing unit;

a read/write head disposed in opposed relation to said information-recording disk; and an actuator for positioning said head on said information-recording disk;

wherein said distal end surface of said spindle is rounded, and said thrust bearing device has a concave surface which is substantially complementary to said rounded distal end surface of said spindle, and is held in opposed relationship with said rounded distal end surface.

* * * * *